(12) United States Patent
Tanaka (10) Patent No.: US 7,862,853 B2
(45) Date of Patent: Jan. 4, 2011

(54) METHOD FOR MANUFACTURING MAGNETIC RECORDING MEDIUM

(75) Inventor: Hiroyuki Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 690 days.

(21) Appl. No.: 11/513,192

(22) Filed: Aug. 31, 2006

(65) Prior Publication Data

US 2007/0054039 A1    Mar. 8, 2007

(30) Foreign Application Priority Data

Sep. 2, 2005   (JP)   ............................. 2005-255479

(51) Int. Cl.
*G11B 33/00* (2006.01)
*C23C 14/54* (2006.01)

(52) U.S. Cl. ...................... 427/128; 427/127; 427/355; 427/9

(58) Field of Classification Search .................. 427/127, 427/128, 355
See application file for complete search history.

(56) References Cited

U.S. PATENT DOCUMENTS

| | | | |
|---|---|---|---|
| 6,265,032 B1 * | 7/2001 | Kurose et al. | ............... 427/547 |
| 6,852,404 B2 | 2/2005 | Kuwajima et al. | |
| 2005/0074635 A1 * | 4/2005 | Mitani et al. | ........... 428/694 ST |

FOREIGN PATENT DOCUMENTS

| | | |
|---|---|---|
| JP | A-2003-296915 | 10/2003 |
| JP | A 2005-108313 | 4/2005 |

* cited by examiner

*Primary Examiner*—Timothy H Meeks
*Assistant Examiner*—Mandy C Louie
(74) *Attorney, Agent, or Firm*—Oliff & Berridge, PLC (57) ABSTRACT

A method for manufacturing a magnetic recording medium with high reliability is provided, which can form a thin magnetic layer having a dry film thickness of, for example, 60 nm or less while the occurrence of defects on the surface is suppressed. In this method, a magnetic paint having a solid concentration NV (mass %) of $3 \leq NV \leq 8$ is applied to a non-magnetic underlayer formed over a non-magnetic support to a wet film thickness Tw in a range of $\leq 2300$ (nm).

2 Claims, 3 Drawing Sheets

METHOD FOR MANUFACTURING MAGNETIC RECORDING MEDIUM

BACKGROUND OF THE INVENTION

1. Field of the Invention

The present invention relates to a magnetic recording medium manufacturing method in which a magnetic layer is formed by applying and drying a magnetic paint.

2. Description of the Related Art

Conventionally, magnetic recording media such as magnetic tapes referred to as LTO (Linear Tape Open, Registered Trade Mark) and DLT (Digital Linear Tape, Registered Trade Mark) are improved in recording density by means of reducing the size of magnetic particles constituting a magnetic layer or other method. Also, in the future, further improvement in the recording density is desired.

Here, a problem arises in that, for example, the influence of self demagnetization due to a demagnetizing field increases as the recording density increases. However, the influence of self demagnetization due to the demagnetizing field can be suppressed by reducing the thickness of a magnetic layer. Therefore, as the recording density increases, the thickness of a magnetic layer is often reduced.

In order to facilitate the understanding of the present invention, a brief description will be given of an example of a method of forming a magnetic layer of a magnetic tape.

First, while a nonmagnetic film-shaped support and a non-magnetic underlayer formed thereon are fed along the plane direction thereof, a nozzle is brought into proximity to the surface of the support to discharge a magnetic paint containing magnetic particles and the like onto the underlayer from the end of the nozzle. Hence, the magnetic paint is applied to the surface of the underlayer to a predetermined wet film thickness. Subsequently, solvent components of the applied magnetic paint are volatilized for drying the magnetic paint to thereby form a magnetic layer having a predetermined dry film thickness.

The thickness of the magnetic layer may be reduced by applying the magnetic paint to a small wet film thickness. However, when the magnetic paint is applied to an excessively small thickness, a problem arises in that defects such as application defects of the magnetic paint are likely to occur.

Therefore, conventionally, the occurrence of defects such as application defects of magnetic paint has been suppressed by applying a magnetic paint to the surface of an underlayer to a sufficiently large wet film thickness of a certain value or larger. In addition to this, the thickness of a magnetic layer has been reduced by reducing the solid concentration NV (nonvolatile) of the magnetic paint (see, for example, Japanese Patent Laid-Open Publication No. 2005-108313).

In the above case, a magnetic paint is applied to the surface of a support to a sufficiently large wet film thickness of a certain value or larger. However, even in this case, when a thin magnetic layer having a dry film thickness of, for example, 60 nm or less is formed, fine stripe-like defects (many stripes of several μm in width and several tens of μm in length) may be formed on the surface of the magnetic layer. These defects increase the surface roughness of the magnetic layer surface and thus may cause problems such as an increase in error rate.

SUMMARY OF THE INVENTION

In view of the foregoing problems, various exemplary embodiments of this invention provide a method for manufacturing a magnetic recording medium with high reliability, which can form a thin magnetic layer having a dry film thickness of, for example, 60 nm or less while the occurrence of defects on the surface is suppressed.

As used herein, the wet film thickness means the thickness of a paint film of a magnetic paint at the time of application and is computed from the amount of a paint supplied from an applicator, the conveying speed of a support, and the application width on the support. Further, the dry film thickness means the actual film thickness of a magnetic layer in a magnetic tape after the magnetic layer is subjected to at least a drying step and a calendering step.

Various exemplary embodiments of the present invention achieve the abovementioned object by applying a magnetic paint having a solid concentration NV (mass %) of $3 \leqq NV \leqq 8$ to a non-magnetic underlayer formed over a non-magnetic support to a predetermined wet film thickness Tw in a range of $Tw \leqq 2300$ (nm).

Even in the case in which a magnetic paint is applied to the surface of an underlayer to a sufficiently large wet film thickness of a certain value or larger, when a thin magnetic layer having a dry film thickness of, for example, 60 nm or less is formed, defects may be formed on the surface of the magnetic layer. The reason for this is not clear but is assumed to be basically as follows. In a magnetic paint, the components thereof such as magnetic particles tend to aggregate when the solid concentration becomes excessively low. Thus, it is conceivable that the aggregation of the magnetic particles and the like is more likely to occur when a magnetic paint is diluted to a solid concentration NV of 8 mass % or less in order to form a thin magnetic layer having a dry film thickness of, for example, 60 nm or less. When such a magnetic paint is applied to be thick, it is conceivable that irregularities are formed on the paint film because of the aggregation of the magnetic particles and the like to thereby result in the formation of a magnetic layer having defects caused by the irregularities.

On the other hand, just after a magnetic paint is discharged onto the surface of a support from a nozzle, a shear force acts on the magnetic paint between an underlayer fed in the longitudinal direction of the support and the nozzle fixed in place. Thus, it is conceivable that the aggregated magnetic particles and the like are dispersed due to the share force. By applying the magnetic paint to a small wet film thickness of a certain value or less, the share force acting on the magnetic paint is increased, and thus the dispersion of the aggregated magnetic particles and the like is facilitated. Therefore, it is conceivable that the aggregated magnetic particles and the like in the paint film are eliminated or the amount thereof is significantly reduced, thereby reducing the occurrence of surface defects.

Normally, the irregularities on the surface of a magnetic paint are reduced by leveling (the applied magnetic paint flows before drying to smooth the surface of the magnetic paint). It is believed that the larger the wet film thickness is, the larger the leveling effect is. However, when the wet film thickness is large, the aggregation of magnetic particles and the like is not sufficiently reduced, and thus irregularities are formed on a paint film. Since these irregularities are not eliminated by leveling, it is conceivable that the irregularities form defects on the surface of a magnetic layer.

In the conventional technology, the solid concentration NV in a magnetic paint is reduced to a certain low value or less, and the magnetic paint is applied to a large wet film thickness of a certain value or more. In this manner, a thin magnetic layer is formed while the occurrence of defects such as application defects on a magnetic layer is suppressed. On the other hand, in various exemplary embodiments of the present invention, the occurrence of surface defects on a magnetic layer is suppressed by applying a magnetic paint to a small wet film thickness of 2300 nm or less in the case in which the solid concentration NV in the magnetic paint is reduced to about 8 mass % or less for reducing the thickness of the magnetic layer as described above. Namely, various exemplary embodiments of the present invention have been made based on a concept different from that of the conventional technology.

Accordingly, various exemplary embodiments of this invention provide a method for manufacturing a magnetic recording medium, comprising an applying step of applying a magnetic paint having a solid concentration NV (mass %) of $3 \leq NV \leq 8$ to a non-magnetic underlayer formed over a non-magnetic support to a predetermined wet film thickness Tw in a range of $Tw \leq 2300$ (nm).

According to various exemplary embodiments of this invention, a thin magnetic layer having a dry film thickness of, for example, 60 nm or less can be formed while the occurrence of defects on the surface is suppressed.

DETAILED DESCRIPTION OF THE PREFERRED EMBODIMENT

Hereinafter, a preferred exemplary embodiment for implementing the present invention will be described in detail with reference to the drawings.

Figure 1:
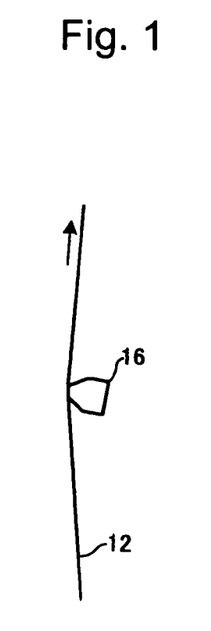
FIG. 1 is a side view schematically showing an applying step of a magnetic paint according to an exemplary embodiment of the present invention.
Figure 2:
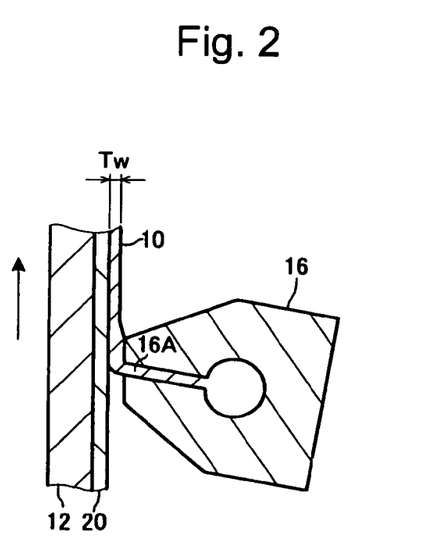
FIG. 2 is an enlarged cross-sectional side view schematically showing a nozzle and therearound in the applying step of the magnetic paint.
Figure 3:
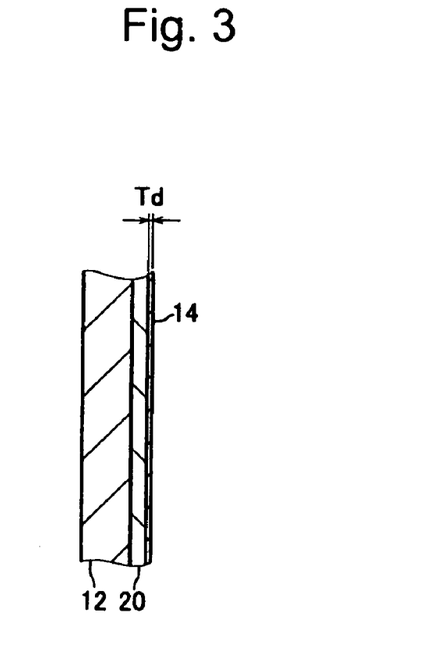
FIG. 3 is a cross-sectional side view schematically showing the state in which the magnetic paint is dried.

This exemplary embodiment relates to a method for manufacturing a magnetic tape (a magnetic recording medium). The exemplary embodiment is characterized by having steps of applying a magnetic paint 10 having a predetermined solid concentration NV (mass %) to a non-magnetic underlayer 20 formed over a non-magnetic support 12 to a predetermined wet film thickness Tw as shown in FIGS. 1 and 2, and drying the magnetic paint 10 to form magnetic layer 14 having a dry film thickness Td of 60 nm or less as shown in FIG. 3. Descriptions of the other steps are omitted as appropriate since they are not considered to be particularly important for understanding this exemplary embodiment.

Figure 4:
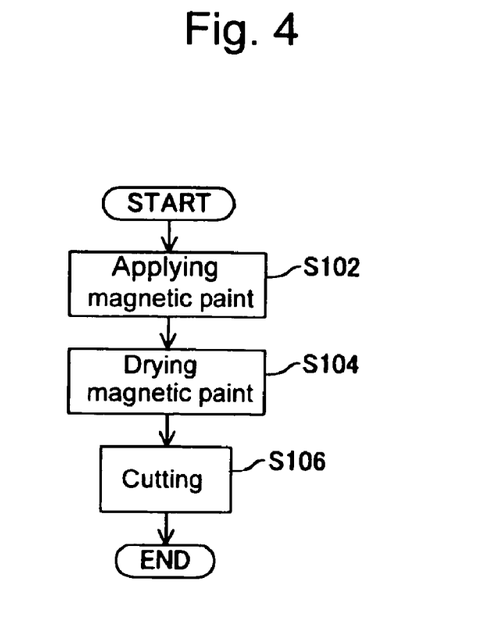
FIG. 4 is a flowchart showing an outline of a magnetic tape manufacturing process according to the exemplary embodiment of the present invention.

Hereinafter, a description will be given of the magnetic tape manufacturing method according to the exemplary embodiment with reference to the flowchart shown in FIG. 4.

First, the magnetic paint 10 having a solid concentration NV (mass %) of $3 \leq NV \leq 8$ is applied to the underlayer 20 to a wet film thickness Tw within a range of 500 (nm) $\leq Tw \leq 2300$ (nm) (S102).

In this exemplary embodiment, the magnetic paint 10 is applied to the underlayer 20 having been dried. Namely, the magnetic paint 10 is applied by means of a wet-on-dry application method.

Furthermore, in this exemplary embodiment, a nozzle application method is employed. In this method, the magnetic paint 10 is discharged from a nozzle 16 placed in proximity to the surface of the underlayer 20 while the support 12 is fed along the longitudinal direction thereof, whereby the magnetic paint 10 is applied to the underlayer 20.

The magnetic paint 10 is prepared by dispersing a magnetic powder and a binder in a solvent. Further, a dispersant, a lubricant, a polishing agent, a hardening agent, an antistatic agent, and the like may be added in accordance with need.

Examples of the magnetic powder which can be used include: $\gamma$-$Fe_2O_3$, $Fe_3O_4$, a solid solution of $\gamma$-$Fe_2O_3$ and $Fe_3O_4$, Co compound-coated $\gamma$-$Fe_2O_3$, Co compound-doped $\gamma$-$Fe_2O_3$, Co compound-coated $Fe_3O_4$, Co compound-doped $Fe_3O_4$, a solid solution of Co compound-coated $\gamma$-$Fe_2O_3$ and Co compound-coated $Fe_3O_4$, a solid solution of Co compound-doped $\gamma$-$Fe_2O_3$ and Co compound-doped $Fe_3O_4$, oxidized ferromagnetic powders such as $CrO_2$, an Fe—Co—Ni alloy, an Fe—Al alloy, a Mn—Bi alloy, an Fe—Al—P alloy, an Fe—Co—Ni—Cr alloy, an Fe—Ni—Zn alloy, an Fe—Co—Ni—P alloy, an Fe—Ni alloy, a Co—Ni alloy, a Co—P alloy, an Fe—Mn—Zn alloy, and an Fe—Ni—Cr—P alloy, ferromagnetic powders containing Fe, Ni, and Co as main components. It should be appreciated that the shape of the non-magnetic powder is preferably a needle shape.

Examples of the binder which can be used include: thermoplastic resins such as vinyl chloride-based copolymers, polyurethane-based resin, acrylic resin, polyester-based resin, acrylonitrile-butadiene-based copolymers, polyamide-based resin, polyvinyl butyral-based resin, nitrocellulose, styrene-butadiene-based copolymers, polyvinyl alcohol resin, acetal resin, epoxy-based resin, phenoxy-based resin, polyether resin, polyimide resin, phenolic resin, a polybutadiene elastomer, and synthetic rubber-based resin; thermosetting resins such as condensation-polymerizable phenolic resin, epoxy resin, polyurethane curable resin, urea resin, butyral resin, melanin resin, alkyd resin, silicone resin, acrylic-based reactive resin, polyamide resin, epoxy-polyamide resin, saturated polyester resin, and urea formaldehyde resin; radiation curable resin; and mixtures thereof.

Examples of the dispersant which can be used include various surfactants. Examples of the lubricant which can be used include higher fatty acids, fatty acid esters, and silicone oil. Examples of the polishing agent which can be used include $\alpha$-alumina, chromium oxide, silicon carbide, silicon oxide, aluminum nitride, and boron nitride.

Examples of the solvent for use in the magnetic paint 10 include cyclohexanone, methyl ethyl ketone, methyl isobutyl ketone, methyl n-butyl ketone, ethyl n-butyl ketone, diisobutyl ketone, isophorone, methyl cellosolve, ethyl cellosolve, toluene, ethyl acetate, and tetrahydrofuran.

Examples of the material for use in the support 12 include: polyester resins such as polyethylene terephthalate, and polyethylene naphthalate; polyolefin resins such as polypropylene; and resin materials such as polyamide, polyimide, polyamide-imide, polysulfone cellulose triacetate, and polycarbonate.

A material containing a non-magnetic powder and a binder may be employed as the material for the underlayer 20. Further, a dispersant, a polishing agent, a lubricant, and the like may be added in accordance with need. Examples of the non-magnetic powder which can be employed include: carbon blacks such as furnace black for rubber, thermal black for rubber, black for color, and acetylene black; inorganic powders such as $\alpha$-iron oxide, titanium oxide, calcium carbonate, $\alpha$-alumina, chromium oxide, barium sulfate, silicon carbide, silicon oxide; and mixtures thereof. Note that the shape of the non-magnetic powder may be a spherical shape, a needle-like shape, a spindle-like shape, or a plate-like shape, among which a spherical shape or a needle-like shape is preferable. As the binder for the underlayer, thermoplastic resins, thermosetting resins, radiation curable resins, and mixtures thereof, each exemplified as the abovementioned binder for the magnetic paint 10, may be employed. Furthermore, a dispersant, a polishing agent, and a lubricant same as or similar to those for the magnetic paint 10 may be employed as those for the underlayer.

In terms of reducing the total thickness of a magnetic tape in order to increase a storage capacity per one cartridge, it is desirable to reduce the film thickness of the underlayer 20. On the other hand, in terms of allowing the surface roughness of the underlayer 20 to be reduced sufficiently without being affected by the surface roughness of the support 12 and of allowing a sufficient amount of the lubricant supplied to the magnetic layer to be stored in the underlayer, it is desirable that the film thickness of the underlayer 20 be a certain value or more. Specifically, the film thickness of the underlayer 20 is preferably set to a range of from 0.3 to 1.2 μm.

The nozzle 16 has a slit 16A formed at the end thereof, and the magnetic paint 10 is discharged from this slit 16A. The support 12 is fed in the longitudinal direction thereof with a predetermined tension applied thereto. As shown in FIG. 1, the nozzle 16 is placed such that the end thereof is pressed against the underlayer 20 formed over the support. Further, the nozzle 16 is placed such that the magnetic paint 10 is discharged in a direction slightly inclined, with respect to a direction perpendicular to the surface of the underlayer 20, to the side of the feeding direction of the support 12. Since the discharged magnetic paint 10 intervenes between the nozzle 16 and the underlayer 20 formed over the support 12, the end of the nozzle 16 is brought into proximity to the surface of the underlayer 20 without contacting the underlayer 20 as shown in FIG. 2.

Since the solid concentration NV (mass %) of the magnetic paint 10 is low ($3 \leq NV \leq 8$), the aggregation of magnetic particles and the like is likely to occur. However, since the magnetic paint 10 is applied to a small wet film thickness Tw of $Tw \leq 2300$ (nm), it is considered that the mobility of the magnetic particles and the like is suppressed in the magnetic paint, thereby suppressing the aggregation of these particles. Therefore, the occurrence of defects on the surface of the magnetic paint is suppressed.

Furthermore, just after the magnetic paint 10 is discharged from the nozzle 16 onto the surface of the underlayer 20, a shear force acts on the magnetic paint 10 between the underlayer 20 formed over the support 12 fed in the longitudinal direction and the nozzle 16 fixed in place. Consequently, it is conceivable that parts of the aggregated magnetic particles or the like are dispersed through the share force. Further, it is also conceivable that the magnetic particles are oriented along the longitudinal direction of the support 12 through the share force. By applying the magnetic paint 10 to a small wet film thickness Tw of $Tw \leq 2300$ (nm), the share force acting on the magnetic paint 10 can be increased. Thus, it is conceivable that the effects of dispersing the aggregated magnetic particles and the like and of orienting the magnetic particles along the longitudinal direction of the support 12 are enhanced by the increase in the share force.

Next, the magnetic paint 10 is dried (S104). Specifically, the magnetic paint 10 is heated in a drying furnace (not shown) by means of hot air, far infrared rays, an electric heater, or the like to volatilize the solvent components. At this time, a magnetic field is applied to the magnetic paint 10 applied to the underlayer 20 by means of a permanent magnet, an electromagnet, or the like to orient the magnetic particles in the magnetic paint 10 along the feeding direction of the support 12. Alternatively, a magnetic field may be applied to the magnetic paint 10 at a point between the applying step (S102) and the drying step (S104), thereby orienting the magnetic particles in the magnetic paint 10 along the feeding direction of the support 12. When the solvent components volatilize, the magnetic paint 10 dries. Thus, the magnetic layer 14 having the dry film thickness Td smaller than the wet film thickness Tw is formed as shown in FIG. 3.

Next, the support 12 having the magnetic layer 14 and the underlayer 20 formed thereover is cut to a predetermined width (S106). Hence, a magnetic tape is completed.

In this exemplary embodiment, the magnetic paint 10 is applied to the underlayer 20 by means of a nozzle application method. However, the magnetic paint 10 may be applied to the underlayer 20 by use of other application method such as a reverse roll application method, a gravure roll application method, a knife coater application method, a doctor blade application method, a kiss-coat application method, a color-coat application method, or a slide bead application method.

Furthermore, in this exemplary embodiment, only the underlayer 20 and the magnetic layer 14 are formed over the support 12. However, over the support 12, a backcoat layer may be formed on a side opposite to the side of the magnetic layer 14. The backcoat layer may be formed by applying and drying a paint for the backcoat layer before the applying step (S102), at a point between the drying step (S104) and the cutting step (S106), or at some other point.

Moreover, in this exemplary embodiment, the cutting step (S106) is carried out just after the drying step (S104). However, cross-linking treatment by heating or irradiation of electron rays or the like, calender treatment, varnish treatment, blade treatment, or the like may be carried out at a point between the drying step (S104) and the cutting step (S106) in accordance with need.

WORKING EXAMPLE

Fifteen types of magnetic tapes were prepared according to the method of the abovementioned exemplary embodiment. Specifically, three types of magnetic paints 10 having different solid concentrations NV (mass %) were prepared. Each of the three magnetic paints 10 was applied to five different wet film thicknesses Tw in the range of $Tw \leq 2300$ (nm) and was then dried. Consequently, fifteen types of magnetic tapes having different dry film thicknesses Td were prepared.

First, fifteen supports 12 were provided, and the underlayer 20 was formed thereon. Specifically, the materials listed below were kneaded in a kneader, and then the mixture was subjected to dispersion in a horizontal type pin mill.

Non-magnetic powder: 80.0 parts by weight of needle-like α-FeOOH (average major axis length: 0.1 μm, crystalline diameter: 12 nm).

Non-magnetic powder: 20.0 parts by weight of carbon black (product of Mitsubishi Chemical Corporation, product name: #950B).

Electron beam curable binder: 12.0 parts by weight of electron beam curable vinyl chloride resin (product of TOYOBO CO., LTD., product name TB-0246).

Electron beam curable binder: 10.0 parts by weight of electron beam curable polyurethane resin (product of TOYOBO CO., LTD., product name TB-0216).

Dispersant: 1.0 part by weight of high molecular weight polyester acid amide amine salt (product of Kusumoto Chemicals, Ltd., product name: DA-7500).

Polishing agent: 5.0 parts by weight of α-alumina (product of Sumitomo Chemical CO., Ltd., product name: HIT60A, average particle size: 0.18 μm). Here, the solid concentration NV was 33 (mass %), and the ratio of solvents was MEK/toluene/cyclohexanone=2/2/1 (mass ratio). Subsequently, the materials listed below were further added.

Lubricant: 1.0 part by weight of fatty acid (product of NOF CORPORATION, product name: NAA180)

Lubricant: 0.5 parts by weight of fatty acid amide (product of KAO CORPORATION, product name: Fatty acid amide S).

Lubricant: 1.5 parts by weight of fatty ester (product of Nikko Chemicals Co., Ltd., product name: NIKKOL BS). The mixture was diluted such that NV (solid concentration)= 25 (mass %) (the ratio of solvents was MEK/toluene/cyclohexane=2/2/1 (weight ratio)). Subsequently, the mixture was subjected to dispersion to thereby prepare a paint serving as the underlayer 20.

Next, this paint was applied to the support 12 having a film thickness of approximately 5.0 μm and made of polyethylene naphthalate by means of a nozzle application method and was then dried. Further, calender treatment was performed by means of a plastic roll and a metal roll, and an electron beam was projected at a dose of 4.0 Mrad to form the underlayer 20 having a film thickness of approximately 1.2 μm on each of the fifteen supports 12.

Next, three types of the magnetic paints 10 having the solid concentrations NV of 3%, 5%, and 8%, respectively, were prepared. Each of the magnetic paints 10 was applied to the underlayer 20 on the five supports 12 to respective five different wet film thicknesses Tw shown in Table 1. Specifically, the materials listed below were kneaded in a kneader, and then the mixture was subjected to dispersion in a horizontal type pin mill.

Magnetic powder: 100.0 parts by weight of Fe-based needle-like ferromagnetic powder (Fe/Co/Al/Y=100/24/5/8 (atomic ratio), Hc: 188 kA/m, σs: 140 Am$^2$/kg).

Binder: 10.0 parts by weight of vinyl chloride copolymer (product of ZEON CORPORATION, product name: MR110).

Binder: 6.0 parts by weight of polyester polyurethane (product of TOYOBO CO., LTD., product name: UR8300).

Dispersant: 3.0 parts by weight of phosphoric acid-based surfactant (product of TOHO Chemical Industry Co., LTD., product name: RE610).

Polishing agent: 10.0 parts by weight of ax-alumina (product of Sumitomo Chemical CO., Ltd., product name: HIT60A). Here, the solid concentration NV was 30 (mass %), and the ratio of solvents was MEK/toluene/cyclohexanone=4/4/2 (mass ratio). The thus-obtained paint was divided into three parts.

One of these was diluted such that NV (solid concentration)=8 (mass %) (the ratio of solvents was MEK/toluene/cyclohexane=13/13/74 (weight ratio)) and was then subjected to final dispersion.

Another one of these was diluted such that NV (solid concentration)=5 (mass %) (the ratio of solvents was MEK/toluene/cyclohexane=7.5/7.5/85 (weight ratio)) and was subjected to final dispersion.

The other one of these was diluted such that NV (solid concentration)=3 (mass %) (the ratio of solvents was MEK/toluene/cyclohexane=4.5/4.5/91 (weight ratio)) and was then subjected to final dispersion.

Further, 10.0 parts by weight of a heat curing agent (product of NIPPON POLYURETHANE INDUSTRY CO., LTD., product name: Colonate L) was added to and mixed with the above mixtures to prepare three types of the magnetic paints 10.

Each of these three types of the magnetic paints 10 was discharged from the nozzle 16 onto the underlayer 20 of the five supports 12 to apply the magnetic paint 10 to five different wet film thicknesses Tw of 400, 500, 1000, 2000, and 2300 nm. Here, the wet film thickness Tw is a value computed from the supply amount of the paint to the nozzle 16, the conveying speed of the support 12, and the application width of the magnetic paint 10.

At this time, a visual observation was made to determine the presence or absence of application defects of the magnetic paint 10. Here, the application defects are a phenomenon in which the magnetic paint 10 is not applied to part of the underlayer 20 and which is caused by an excessively small wet film thickness Tw, variations in the support 12, or other cause. The observation results are shown in Table 1. As shown in Table 1, when the magnetic paint 10 was applied to wet film thicknesses Tw of 500 (nm)≦Tw, the application defects were not found. However, when the magnetic paint 10 was applied to a wet film thickness Tw of 400 (nm), the application defects were found in part of the underlayer 20.

Next, the solvent components of the applied magnetic paint were volatilized for drying the magnetic paint while the orienting treatment was performed. Furthermore, calender treatment was performed by use of plastic roll and metal roll to form the magnetic layer 14.

Next, on each of the supports 12, the backcoat layer was formed on a side opposite to the side on which the magnetic layer 14 was formed. Specifically, the materials listed below were sufficiently kneaded in a kneader, and the mixture was subjected to dispersion in a sand grind mill.

75 parts by weight of carbon black (product of Cabot Corporation, product name: BP-800).

10 parts by weight of carbon black (product of Cabot Corporation, product name: BP-130).

15 parts by weight of barium sulfate (product of SAKAI CHEMICAL INDUSTRY CO., LTD., product name: BARIFINE BF-20).

80 parts by weight of nitrocellulose (product of Asahi Kasei Corporation, product name: BTH1/2).

40 parts by weight of polyurethane resin (product of TOYOBO CO., LTD., product name: UR-8300).

150 parts by weight of methyl ethyl ketone.

150 parts by weight of toluene.

80 parts by weight of cyclohexane. Furthermore, the materials listed below were added.

400 parts by weight of methyl ethyl ketone.

400 parts by weight of toluene.

200 parts by weight of cyclohexane.

Then, the mixture was subjected to further dispersion. 20 parts by weight of a heat curing agent (product of NIPPON POLYURETHANE INDUSTRY CO., LTD., product name: Colonate L) was mixed with the thus-obtained mixture to prepare a paint for the backcoat layer.

For each of the supports 12, this paint for the backcoat layer was discharged from a nozzle onto a surface opposite to the side of the magnetic layer 14 to apply the paint and was then dried. Furthermore, calender treatment was performed by means of plastic roll and metal roll to form a backcoat layer having a film thickness of approximately 0.5 μm.

Each of the supports 12 over which the underlayer 20, the magnetic layer 14, and the backcoat layer were formed as described above was wound onto a roll. Each of the wound supports 12 was left to stand at normal temperature for 24 hours, was held in a temperature environment of 60° C. for about 48 hours for heat curing, and then was cut to a width of 12.65 mm (½ inches) to produce a magnetic tape.

The dry film thickness Td of the magnetic layer 14 of each of the magnetic tapes is shown in Table 1. The dry film thickness Td was determined by TEM observation of the cross-section of the magnetic tapes after cutting.

The surface of each of these magnetic tapes was observed under an optical microscope to determine the presence or absence of streak-like surface defects. The observation results are shown in Table 1. Here, in the magnetic tapes to which the magnetic paint 10 was applied to a wet film thickness Tw of 400 nm, application defects were generated. For these tapes, the presence or absence of surface defects was determined in a region in which the application defects were not generated.

Further, a servo signal was recorded on these magnetic tapes to determine waviness in the width direction. For the magnetic tapes to which the magnetic paint 10 was applied to a wet film thickness Tw of 400 nm and in which application defects were generated, the waviness in the width direction was determined in a region in which the application defects were not generated. A method of determining the waviness will next be described briefly.

A Wyko NT-2000 System (product of Veeco Instruments) was used for the determination of waviness. A super reference mirror was placed on an XY750 sample stage. A 50× lens (Mirau type interference method, numerical aperture (NA): 0.55, working distance: 3.4 mm, optical resolution: 0.55, and maximum inclination: 25 degrees) was employed as an infinite conjugate magnifying objective lens, and a 1× lens was employed as an internal lens. Further, Wyko Vision 32 was employed as software. By means of phase shifting interferometry (PSI), measurement was performed four times at each of four positions on the super reference mirror, and the obtained measurement data was subjected to averaging processing for extracting a reference surface shape intrinsic to the objective lens. Thus, a reference surface was prepared.

Next, each of the magnetic tapes on which the servo signal was recorded was placed on the XY750 sample stage such that the surface of the magnetic layer faces the objective lens, and a position of the surface of the magnetic layer was adjusted so that interference fringes of the surface would be a null state by use of XY direction adjustment knobs. Some parts of the surface of the magnetic layer in a measurement field of view were projected onto a CCD camera having 480×736 pixels through an interference system to determine average data of four analyses. Here, the measurement field of view has dimensions of 93.9 μm (in the longitudinal direction of the magnetic tape)×123.5 μm (in the width direction of the magnetic tape). One pixel corresponds to a region having dimensions of 0.20 μm (in the longitudinal direction of the magnetic tape)×0.17 μm (in the width direction of the magnetic tape).

Next, the obtained image data was subjected to inclination correction and cylindrical correction for removing inclination and cylindrical shape from the measurement data.

Next, the corrected image data was Fourier transformed to determine characteristics related to asperities on the surface of the magnetic layer of the magnetic tape. Specifically, the following characteristics were obtained: curves forming the waviness in the longitudinal direction of the magnetic tape; the intensity of the waviness; the frequency (1/mm) of curves forming the waviness in the width direction of the magnetic tape; and the power spectral density (PSD) (mm nm$^2$) representing the intensity at the frequency of the waviness.

Next, the determined frequency was converted to wavelength to obtain the wavelength of the curves forming the waviness in the width direction on the surface of the target magnetic layer and the intensity of the waviness at this wavelength. The measurement results of the PSD for the curves forming the waviness in the width direction on the surface of the magnetic layer are shown in Table 1. The longer the wavelength is, the larger the value of the PSD is. The values of the PSD shown in Table 1 are a value when the wavelength of the curves forming the waviness in the width direction of the magnetic tape is 0.5 μm.

Furthermore, these magnetic tapes were evaluated for defects. However, when the evaluation is made using error rate, the evaluation results depend largely on the thickness of the magnetic layer, and thus it is difficult to make a comparison between samples having different magnetic layer thicknesses. Therefore, in place of the defect evaluation using error rate, evaluation using missing pulses was performed on magnetic tapes other than the magnetic tapes to which the magnetic paint 10 was applied to a wet film thickness Tw of 400 nm and in which application defects were generated. Next, a method of measuring missing pulses is described briefly.

Figure 5:
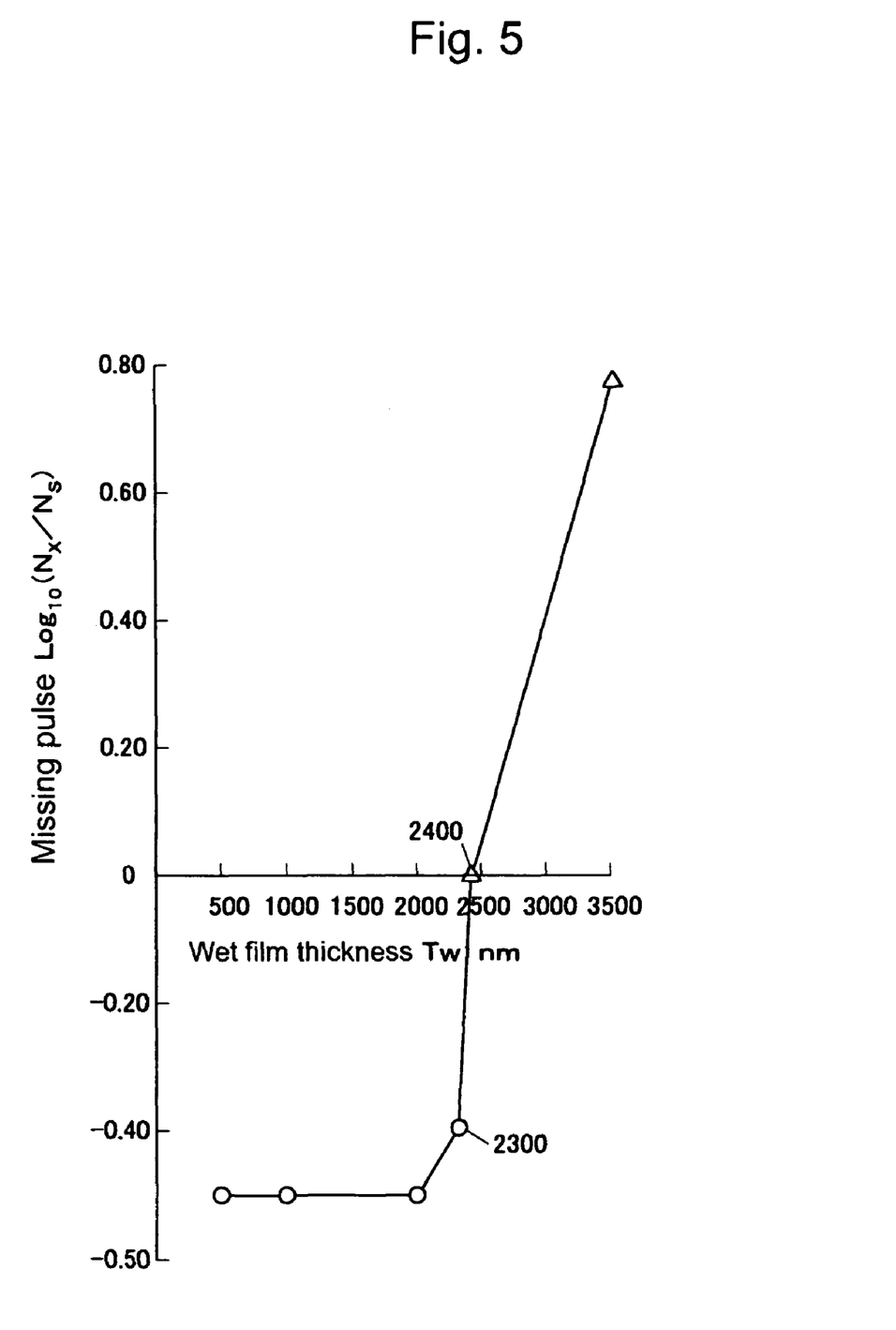
FIG. 5 is a graph showing the relationship between a wet film thickness and a missing pulse in the manufacturing step of magnetic tapes of Working Example and Comparative Example.

In the measurement of missing pulses, a Small Format Tape System (product of MAC, hereinafter referred to as SFTES) was employed, and a recording head and a reproduction head were attached to the SFTES. As the reproduction head, a magnetoresistance effect type magnetic head (an MR head) was employed. Each of the magnetic tape was mounted in a cartridge, and the cartridge was attached to the SFTES. Recording was performed on the magnetic tape at a single recording wavelength of 0.25 μm. The missing pulse was defined as a P-0 signal having an amplitude equal to or less than 25% of the P-P (peak to peak) amplitude of a signal at a point 2.54 cm (in a tape length) ahead of the P-0 signal, and a long defect was defined as four or more consecutive missing pulses. Further, when one or more missing pulses occurred in a section of 500 bytes, these pulses were also regarded as the long defect. Then, $\text{Log}_{10}(N_x/N_s)$ was calculated for each of the magnetic tapes. Here, $N_s$ is the number of long defects per 1 m in a magnetic tape of Comparative Example described later which tape has a wet film thickness Tw of 2400 nm, and $N_x$ is the number of long defects per 1 m in each of the magnetic tapes. The calculation results are shown in Table 1 and FIG. 5. In FIG. 5, circles represent the data of the Working Example.

TABLE 1

| | Wet film thickness Tw (nm) | Dry film thickness Td (nm) | Solid concentration NV (%) | Application defect | Surface defect | Width direction PSD (nm2 mm) | Missing pulse |
|---|---|---|---|---|---|---|---|
| Working Example | 400 | 11 | 8 | presence | absence | $3.0 \times 10^{-6}$ | — |
| | | 8 | 5 | | | | |
| | | 7 | 3 | | | | |

TABLE 1-continued

|  | Wet film thickness Tw (nm) | Dry film thickness Td (nm) | Solid concentration NV (%) | Application defect | Surface defect | Width direction PSD (nm2 mm) | Missing pulse |
|---|---|---|---|---|---|---|---|
|  | 500 | 13 | 8 | absence | absence | $3.0 \times 10^{-6}$ | −0.45 |
|  |  | 10 | 5 |  |  |  |  |
|  |  | 9 | 3 |  |  |  |  |
|  | 1000 | 26 | 8 | absence | absence | $3.0 \times 10^{-6}$ | −0.45 |
|  |  | 21 | 5 |  |  |  |  |
|  |  | 18 | 3 |  |  |  |  |
|  | 2000 | 53 | 8 | absence | absence | $3.0 \times 10^{-6}$ | −0.45 |
|  |  | 42 | 5 |  |  |  |  |
|  |  | 36 | 3 |  |  |  |  |
|  | 2300 | 60 | 8 | absence | absence | $3.5 \times 10^{-6}$ | −0.39 |
|  |  | 48 | 5 |  |  |  |  |
|  |  | 42 | 3 |  |  |  |  |
| Comparative Example | 2400 | 63 | 8 | absence | presence | $6.0 \times 10^{-6}$ | 0.00 |
|  |  | 50 | 5 |  |  |  |  |
|  |  | 44 | 3 |  |  |  |  |
|  | 3500 | 92 | 8 | absence | presence | $1.2 \times 10^{-5}$ | 0.77 |
|  |  | 73 | 5 |  |  |  |  |
|  |  | 64 | 3 |  |  |  |  |

COMPARATIVE EXAMPLE

Each of the three types of the same magnetic paints 10 as in the above Working Example (solid concentrations NV (mass %) of 3%, 5%, and 8%) was applied in two different wet film thicknesses Tw larger than 2300 nm (i.e., 2400 nm and 3500 nm) and was dried to prepare six types of magnetic tapes having different dry film thicknesses Td.

As in the Working Example, in the manufacturing step of these magnetic tapes, a visual observation was made to determine the presence or absence of the application defects generated when the magnetic paint 10 was applied. As shown in Table 1, the application defects were not found.

Moreover, as in the Working Example, the surface of each of these magnetic tapes was observed under an optical microscope to determine the presence or absence of streak-like surface defects. The observation results are shown in Table 1.

Further, as in the Working Example, a servo signal was recorded on each of these magnetic tapes to determine the waviness in the width direction. The measurement results are shown in Table 1.

Moreover, as in the Working Example, the evaluation using missing pulses was performed on each of these magnetic tapes. The measurement results are shown in Table 1 and FIG. 5. In FIG. 5, a triangle represents the data of the Comparative Example.

As shown in Table 1, in all the magnetic tapes of the Comparative Example, surface defects likely to cause practical problems were found. On the other hand, in the magnetic tapes of the Working Example (for the magnetic tapes in which the application defects were found, a portion in which the application defects were not generated was observed), no surface defects likely to cause practical problems were found.

Further, in all the magnetic tapes of the Comparative Example, the PSD in the width direction was $6.0 \times 10^{-6}$ nm$^2$ mm or more. On the other hand, in all the magnetic tapes of the Working Example (for the magnetic tapes in which the application defects were found, a portion in which the application defects were not generated was observed), the PSD in the width direction was suppressed to $3.5 \times 10^{-6}$ nm$^2$ mm or less.

As shown in Table 1 and FIG. 5, the value of $\text{Log}_{10}(N_X/N_S)$ indicating the missing pulses does not depend on the solid concentration NV but tends to increase or decrease depending on the value of the wet film thickness Tw of the magnetic paint 10. Furthermore, it was found that $\text{Log}_{10}(N_X/N_S)$ has stable low negative values at wet film thicknesses of 2300 nm or less but increases significantly at wet film thicknesses of 2400 nm or more (larger than 2300 nm). Namely, it was found that, in the magnetic tapes of the Working Example having a wet film thickness of 2300 nm or less (other than the magnetic tapes in which the application defects were found), $N_X$ was suppressed to a favorable smaller value as compared to $N_S$ of the magnetic tapes of the Comparative Example.

It is conceivable that the above evaluation results were obtained due to the following reasons: The solid concentration NV (mass %) in the magnetic paint 10 is low ($3 \leq NV \leq 8$), and thus magnetic particles and the like tend to aggregate. In the Comparative Example, the magnetic paint 10 was applied in a wet film thickness Tw larger than 2300 nm, and thus the aggregation of the magnetic particles and the like was not satisfactorily suppressed. On the other hand, in the manufacturing process of the magnetic tapes of the Working Example, the magnetic paint 10 was applied to small wet film thicknesses Tw of 2300 nm or less, and thus it is conceivable that the aggregation of the magnetic particles and the like was satisfactorily suppressed.

Namely, it has been found that, by applying a magnetic paint having a solid concentration NV (mass %) of $3 \leq NV \leq 8$ to a predetermined wet film thickness Tw(nm) in the range of Tw$\leq$2300 nm, a thin magnetic layer having a dry film thickness of, for example, 60 nm or less can be formed while the occurrence of defects on the surface is suppressed.

Furthermore, as mentioned above, in the magnetic tapes of the Working Example, the magnetic paint 10 was applied to small wet film thicknesses Tw of 2300 nm or less. In the manufacturing process, the application defects of the magnetic paint 10 were not found in the magnetic tapes to which the magnetic paint 10 was applied to wet film thicknesses Tw of 500 nm or more. On the other hand, the application defects of the magnetic paint 10 were found in the magnetic tapes to which the magnetic paint 10 was applied to a wet film thickness Tw of 400 nm. Hence, it has been found that the occurrence of the application defects of the magnetic paint can be prevented by applying the magnetic paint to a wet film thickness Tw of 500 (nm)$\leq$Tw.

The present invention can be utilized for manufacturing a magnetic recording medium in which a magnetic layer is formed by applying and drying a magnetic paint.

What is claimed is:

1. A method for manufacturing a magnetic recording medium, comprising an applying step of applying a magnetic paint having a solid concentration NV of 3 mass %$\leqq$NV$\leqq$8 mass % to a non-magnetic underlayer formed over a non-magnetic support to a predetermined wet film thickness Tw in a range of 500 nm$\leqq$Tw$\leqq$2300 nm, so that a magnetic tape is formed having PSD for curves forming waviness on a surface in a width direction suppressed to $3.5 \times 10^{-6}$ nm$^2$ mm or less when wavelength of the curve is 0.5 μm.

2. The method for manufacturing a magnetic recording medium according to claim 1, wherein the underlayer is formed over the support to a film thickness of 1.2 μm or less.

* * * * *